US010465108B2

(12) United States Patent
Mesher et al.

(10) Patent No.: US 10,465,108 B2
(45) Date of Patent: Nov. 5, 2019

(54) AMIDE BRANCHED AROMATIC GELLING AGENT BREAKERS

(71) Applicant: Synoil Fluids Holdings Inc., Calgary (CA)

(72) Inventors: Shaun T. Mesher, Calgary (CA); Chris Collett, Calgary (CA)

(73) Assignee: Synoil Fluids Holdings Inc., Calgary (CA)

( * ) Notice: Subject to any disclaimer, the term of this patent is extended or adjusted under 35 U.S.C. 154(b) by 175 days.

(21) Appl. No.: 15/524,571

(22) PCT Filed: Nov. 4, 2015

(86) PCT No.: PCT/CA2015/051135
§ 371 (c)(1),
(2) Date: May 4, 2017

(87) PCT Pub. No.: WO2016/070275
PCT Pub. Date: May 12, 2016

(65) Prior Publication Data
US 2018/0022986 A1     Jan. 25, 2018

Related U.S. Application Data

(60) Provisional application No. 62/075,152, filed on Nov. 4, 2014.

(51) Int. Cl.
*C09K 8/62* (2006.01)
*C09K 8/524* (2006.01)
*C09K 8/035* (2006.01)
*C09K 8/70* (2006.01)
*E21B 21/00* (2006.01)
*E21B 43/26* (2006.01)

(52) U.S. Cl.
CPC .............. *C09K 8/62* (2013.01); *C09K 8/035* (2013.01); *C09K 8/524* (2013.01); *C09K 8/706* (2013.01); *E21B 21/00* (2013.01); *E21B 43/26* (2013.01); *C09K 2208/26* (2013.01)

(58) Field of Classification Search
CPC ........ C09K 8/622; C09K 8/035; C09K 8/524; C09K 8/706; C09K 2208/26; E21B 21/00; E21B 43/26
See application file for complete search history.

(56) References Cited

U.S. PATENT DOCUMENTS 3,629,109 A   12/1971   Gergel et al.
3,853,774 A   12/1974   Crocker
(Continued)

FOREIGN PATENT DOCUMENTS

WO   2013/040718 A1   3/2013
WO   2014/043819 A1   3/2014

OTHER PUBLICATIONS

"AGN-PC-0JBD6L," PubChem Compound Summary, <http:www.pubchem.ncbi.nlm.nih> [retrieved Oct. 21, 2014], 12 pages.
(Continued)

*Primary Examiner* — Aiqun Li
(74) *Attorney, Agent, or Firm* — Christensen O'Connor Johnson Kindness PLLC

(57) ABSTRACT

Breakers for gelling agents are disclosed, for example pyromellitamide gelling agents. The breakers include sulfonic acids in one example.

19 Claims, 1 Drawing Sheet

(56) References Cited

U.S. PATENT DOCUMENTS

| | | | |
|---|---|---|---|
| 4,225,446 A | 9/1980 | Arnold et al. | |
| 6,162,766 A | 12/2000 | Muir et al. | |
| 2002/0165101 A1* | 11/2002 | Taylor ................. | C09K 8/64 507/200 |
| 2011/0101319 A1 | 5/2011 | Fukumatsu et al. | |
| 2013/0085087 A1* | 4/2013 | Mesher ............... | C09K 8/035 507/131 |

OTHER PUBLICATIONS

"AGN-PC-0JBD62," PubChem Compound Summary, <http:www.pubchem.ncbi.nlm.nih> [retrieved Oct. 21, 2014], 12 pages.
"P-Toluenesulfonic acid," Wikipedia, The Free Encyclopedia, <http:en.wikipedia.org/wiki/p-Toluensesulfonic acid> [retrieved Oct. 21, 2014], 4 pages.
"Sulfonic acid," Wikipedia, The Free Encyclopedia, <http:en.wikipedia.org/wiki/Sulfonic acid> [retrieved Oct. 21, 2014], 6 pages.
Munegumi, T., "Where is the border line between strong acids and weak acids?"; World Journal of Chemical Education 1(1):12-16, Nov. 2013.
International Search Report with Written Opinion dated Feb. 24, 2016, issued in corresponding International Application No. PCT/CA2015/051135, filed Nov. 4, 2015, 6 pages.

* cited by examiner

AMIDE BRANCHED AROMATIC GELLING AGENT BREAKERS

TECHNICAL FIELD

This document relates to amide branched aromatic gelling agent breakers.

BACKGROUND

Benzamide gelling agents have been proposed or used in LCD displays and as amide nucleating agents. Pyromellitamide gelling agents have been proposed or used in tissue engineering, drug delivery, LCD displays, catalysis, and downhole fluid treatment.

SUMMARY

Methods of breaking a gel by modifying the gel are disclosed. Modifications include breaking or making covalent bonds, and in some cases both making and breaking. Amide groups may be cleaved, for example by converting adjacent amide groups into an imide.

A method of breaking a gel, the gel comprising base fluid and gelling agent, each gelling agent having a pair of amide groups distributed about an aromatic core, each of the amide groups having one or more organic groups, the method comprising modifying the molecular structure of the gelling agent by using a breaker to cleave or make a covalent bond in the gelling agent.

A method of breaking a gel, the method comprising converting pairs of amide groups into imide groups.

A method of breaking a gel, the gel comprising base fluid and gelling agent, each gelling agent having a pair of amide groups, the method comprising converting with a breaker the pair of amide groups into an imide group.

A fluid comprising a base fluid, a gelling agent, and a breaker, in which the gelling agent has an aromatic core of one or more aromatic rings, the gelling agent has two or more amide branches distributed about the aromatic core, and each of the two or more amide branches has one or more organic groups, and in which the breaker comprises a covalent bond cleavage agent.

A fluid comprising a hydrocarbon base fluid, a gelling agent, and a breaker, in which the gelling agent with an aromatic core of one or more aromatic rings, the gelling agent has two or more amide branches distributed about the aromatic core, and each of the two or more amide branches has one or more organic groups, and in which the breaker comprises a hydrocarbon soluble acid catalyst.

A fluid comprising a hydrocarbon base fluid, a gelling agent, and a breaker, in which the gelling agent with an aromatic core of one or more aromatic rings, the gelling agent has two or more amide branches distributed about the aromatic core, and each of the two or more amide branches has one or more organic groups, and in which the breaker comprises a sulfonic acid.

A fluid comprising a hydrocarbon base fluid, a gelling agent, and a breaker, in which the gelling agent with an aromatic core of one or more aromatic rings, the gelling agent has two or more amide branches distributed about the aromatic core, and each of the two or more amide branches has one or more organic groups, and in which the breaker comprises a hydrocarbon soluble strong acid.

A fluid comprising a hydrocarbon base fluid, a gelling agent, and a breaker, in which the gelling agent with an aromatic core of one or more aromatic rings, the gelling agent has two or more amide branches distributed about the aromatic core, with at least two of amide branches being adjacent one another, and each of the two or more amide branches has one or more organic groups, and in which the breaker comprises an adjacent amide branch to imide conversion agent.

In various embodiments, there may be included any one or more of the following features: Modifying comprises cleaving a covalent bond in the gelling agent; Cleaving comprises cleaving one or more of the amide groups; Cleaving comprises converting a pair of the amide groups into an imide group; The imide group and aromatic core form a phthalimide substructure; The breaker acts as a catalyst for the modifying; The breaker comprises an acid; The acid comprises a sulfonic acid; The sulfonic acid comprises para toluenesulfonic acid; The sulfonic acid comprises one or more of Camphor-10-sulfonic acid, ethane sulfonic acid, 2-naphthalene sulfonic acid, 2-sulfobenzoic acid hydrate, benzene sulfonic acid, and trifluoromethane sulfonic acid; The acid comprises one or more of fluoroantimonic acid, fluorosulfuric antimony pentafluoride, and trifluoroacetic acid; The breaker comprises a strong acid that is soluble in the base fluid; The strong acid is a super acid; Prior to modifying, supplying the breaker into the base fluid in particulate form, each particulate having a coating shell; The coating shell is insoluble in, and permeable to, the base fluid, and further comprising transporting the breaker from within the coating shell to outside the coating shell using base fluid; The breaker is a solid within the particulates when the breaker is supplied into the base fluid; The coating shell comprises a polymer, for example plastic; The coating comprises one or more of poly(vinylidene chloride) (PVDC), poly(isoprene), poly(neoprene), poly(butadiene), poly(styrene cobutadiene) and poly(styrene); The coating comprises poly(vinylchloride); The breaker is adsorbed onto an adsorbent within the particulates when the breaker is supplied into the base fluid; The adsorbent comprises one or more of diatomaceous earth, silica, zeolites, and clay; Prior to modifying, injecting the base fluid, gelling agent, and breaker, into a downhole formation; Each of the amide branches is connected to the aromatic core via a carbon-carbon or carbon-nitrogen bond; One or more of the amide branches are connected to the aromatic core via a carbon-nitrogen bond; Each of the amide branches is connected to the aromatic core via a carbon-nitrogen bond; Three or four amide branches are present; Each organic group is an alkyl group; Each alkyl group is a straight chain alkyl group; Each alkyl group has 6-24 carbon atoms; The aromatic core is benzene; Each of the amide branches are connected to the aromatic core via a carbon-nitrogen bond, and each organic group is an alkyl group with 6-24 carbon atoms; One or more of the amide branches is connected to the aromatic core via a carbon-carbon bond and one or more of the amide branches are connected to the aromatic core via a carbon-nitrogen bond; Each alkyl group has 6-12 carbon atoms; The aromatic core is naphthalene; Each of the amide branches has one organic group; The gelling agents exclude pyromellitamide gelling agents; The gelling agent is a pyromellitamide gelling agent; The pyromellitamide gelling agent has the general formula of:

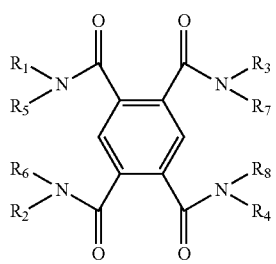

with $R_1$, $R_2$, $R_3$, $R_4$, $R_5$, $R_6$, $R_7$, and $R_8$ each being a hydrogen or an organic group; $R_5$, $R_6$, $R_7$, and $R_8$ are each hydrogens and one or more of $R_1$, $R_2$, $R_3$, and $R_4$ is each an alkyl group; $R_1$, $R_2$, $R_3$, and $R_4$ are each alkyl groups; $R_1=R_2=R_3=R_4$; $R_1$, $R_2$, $R_3$, and $R_4$ each has at least 6 carbon atoms; Each alkyl group has 6-24 carbon atoms; Each alkyl group has 6-10 carbon atoms; Each alkyl group is one or more of straight chain, branched, aromatic, or cyclic; Each alkyl group is straight chain; $R_5$, $R_6$, $R_7$, and $R_8$ are each hydrogens, and $R_1$, $R_2$, $R_3$, and $R_4$ are each straight chain alkyl groups with 6-10 carbon atoms; $R_1$, $R_2$, $R_3$, and $R_4$ have 6 carbon atoms; The base fluid comprises hydrocarbons; The hydrocarbons have 3-8 carbon atoms; The hydrocarbons have 3-24 carbon atoms; The hydrocarbons comprise liquefied petroleum gas; The base fluid comprises one or more of nitrogen or carbon dioxide; A breaker is used or present; The breaker is a water-activated breaker and the downhole fluid comprises a hydrate; The breaker further comprises an ionic salt; The ionic salt further comprises one or more of a bromide, a chloride an organic salt, and an amine salt; The breaker comprises one or more of an alcohol or alkoxide salt; The one or more of an alcohol or alkoxide salt has 2 or more carbon atoms; The alkoxide salt is present and comprises aluminium isopropoxide; The alkoxide salt is present and the downhole fluid comprises a hydrate; The breaker comprises a salt of piperidine and the downhole fluid comprises a hydrate; The breaker further comprises a coating; The coating further comprises wax; There may be present a gel accelerator, or agent for improving solvation of the breaker; The gel accelerator may be used to speed up the gelling process, for example from hours to seconds, although depending on the gel accelerator used, the end point of gel viscosity might not be higher when using a gel accelerator when compared with not using the gel accelerator; The gel accelerator may be an alcohol or acetate, for example a higher alcohol such as decanol or higher acetate such as octal acetate, and may function by opening up the gel to expose the gel to rapid contact with hydrocarbons in the base fluid; Other solvation aiding solvents include methyl ethyl ketone, ethyl acetate, methyl acetate, propyl acetate, octanol, decanol, ethylene glycol, DMF, biodiesel, 2, pentanone, 2,3-pentandione, dioxane, acetyl acetone, acetone, Toluene, diethyl ether, THF, pentane Gelling speed may also be improved by reducing particle size; The gel accelerator should not be overloaded in the gel, since it may break the gel; The metal compound is present and comprises one or more of iron and aluminium; The downhole fluid has a surfactant for dispersing the gel accelerator in the base fluid; The metal compound comprises iron (III) sulfate; The surfactant forms a complex with the gel accelerator in the base fluid; The metal compound is soluble in pure form in the base fluid; The metal compound comprises a metal alkoxide; The metal alkoxide comprises aluminium isopropoxide; The gelling agent forms a hydrogen-bond network through intermolecular hydrogen bonds between the amide branches of adjacent gelling agent molecules, and in which the gel accelerator cross-links the intermolecular hydrogen bonds or facilitates the intermolecular hydrogen bonds; The downhole fluid has a modifier selected to convert the gel accelerator into a breaker; The gel accelerator is present below a threshold concentration above which the gel accelerator becomes a breaker, and in which the modifier comprises an additional source of gel accelerator sufficient to raise the concentration of gel accelerator to above the threshold concentration; The gel accelerator comprises piperidine or piperazine; The gel accelerator comprises piperidine and the modifier comprises benzylamine; The gel accelerator comprises a salt of an aromatic carboxylic acid, and in which the modifier comprises a protonation source or a cation complexing agent; The protonation source comprises acid; The cation complexing agent comprises citric acid and the salt of an aromatic carboxylic acid comprises ibuprofen salt; The modifier further comprises a coating; A breaker and a gel accelerator may be present and distinct from one another; The breaker comprises an aromatic carboxylic acid; The breaker comprises one or more of ibuprofen and hydrocinnamic acid; The breaker comprises one or more of diphenylacetic acid, benzoic acid, and phenylacetic acid; A cation complexing agent is present, in which the aromatic carboxylic acid is a salt; The aromatic carboxylic acid comprises an ibuprofen salt and the cation complexing agent comprises citric acid; The gelling agent forms a hydrogen-bond network through intermolecular hydrogen bonds between the amide branches of adjacent gelling agent molecules, and in which the breaker disrupts the intermolecular hydrogen bonds; The breaker is a hydrogen bonding agent that forms a hydrogen bond, with the amide branches of the gelling agent, that is stronger than the intermolecular hydrogen bonds between the amide branches of adjacent gelling agent molecules; The downhole fluid is for use as a drilling fluid; The downhole fluid is for use as a downhole treatment fluid; Introducing the downhole fluid into a downhole formation; Fracturing the downhole formation; Recovering downhole fluid from the downhole formation, and recycling the recovered downhole fluid; Recycling further comprises removing a breaker from the recovered downhole fluid; The gelling agent is provided with a carrier; The carrier comprises glycol; The gelling agent is provided with a wetting agent; The gelling agent is provided with a suspending agent; and Combining is done on the fly before introducing the downhole fluid into a downhole formation.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
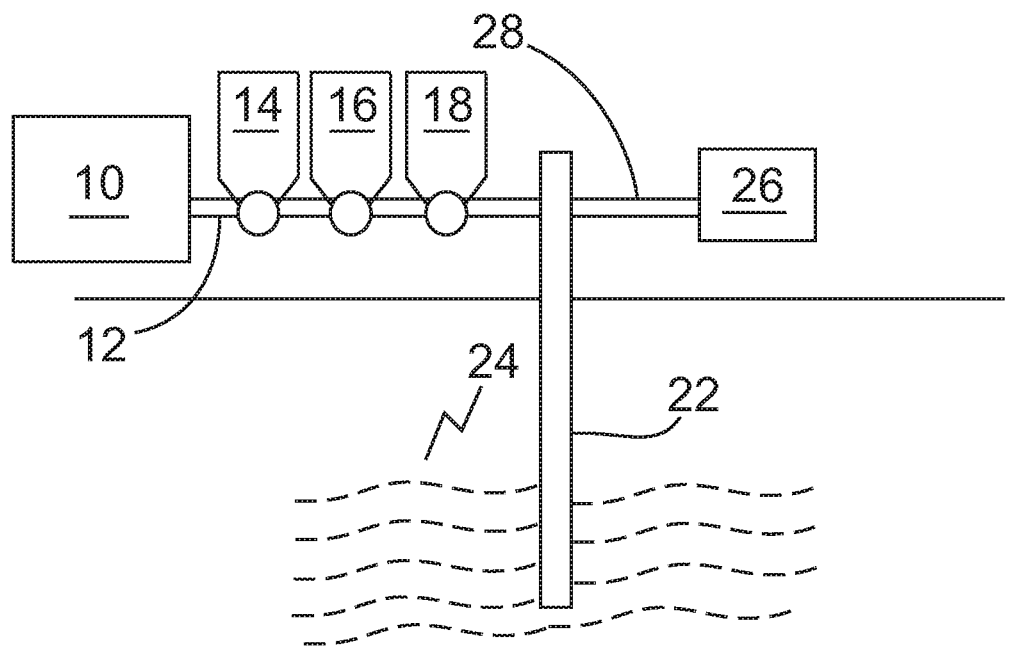
FIG. 1 is a side elevation view illustrating a system and method of making a downhole fluid and a method of using a downhole fluid.
Figure 2:
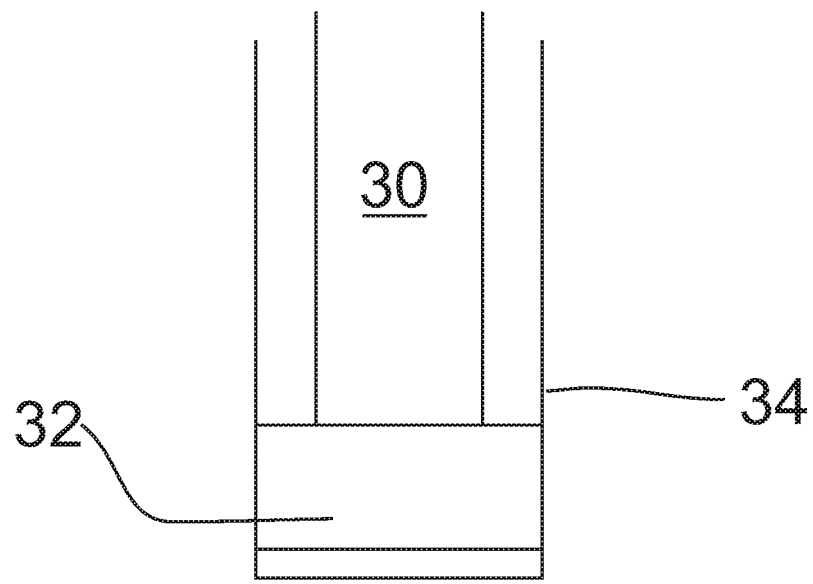
FIG. 2 is a side elevation view of a drill bit drilling a well.

Immaterial modifications may be made to the embodiments described here without departing from what is covered by the claims.

Examples of gelling agents that may be broken in the methods and fluids disclosed here are disclosed in PCT Publication Nos. WO2013040718 and WO2014146191.

In tests a sulfonic acid was absorbed onto silica gel and coated with a hydrocarbon-soluble, hydrocarbon-permeable or hydrogen-degradable polymer coating for use as a delayed breaker in hydraulic fracturing. A gelling agent referred to as BTA6 (N,N,N",N'"-tetrahexylbenzene-1,2,4,5-tetracarboxamide) and illustrated below in reaction (1) was added to a hydrocarbon base fluid to form a gel. The hydrocarbon base fluid may for example comprise refined C8-C10 alkanes, isoalkanes and aromatics having a density of about 730 to 840 kg/m$^3$, and in this example 840 kg/m$^3$ In many examples only 10 mol % of acid (relative to BTA6) was needed to fully break the gel.

Several breakers were successfully tested. For example, p-toluene sulfonic acid (PTSA) anhydrous and monohydrate, Camphor-10-sulfonic acid, ethane sulfonic acid, 2-naphthalene sulfonic acid, 2-sulfobenzoic acid hydrate, and benzene sulfonic acid. P-toluene sulfonic anhydride was also tested, and in this case water was added to the gel to facilitate the hydrolysis of the anhydride to generate PTSA in situ. Solid breakers are easier to control and form particulates with, for example ethane sulfonic acid is liquid and difficult to work with, while PTSA is solid and thus easier to work with.

A series of super acids were also successfully tested. For example, trifluoromethane sulfonic acid, fluoroantimonic aid hexahydrate, magic acid (fluorosulfuric antimony pentafluoride), nafion 117 solution.

Breaker particulates were prepared as follows. The breaker was absorbed onto silica gel (10 wt %) and a coating was applied using a VFC Lab Mini Flo-Coater® multipurpose lab fluid bed, produced by Freund-Vector Corporation. Several coatings were tested, including hydrocarbon soluble and insoluble coatings. Tests used 3 kg/m3 breaker in gel concentration with 10 wt % PTSA adsorbed on Silica as the particulate core. Adsorbing may be carried out by for example mixing acid with Si in liquid, rotovapping or otherwise evaporating the liquid, leaving behind Si impregnated with acid breaker.

For example, poly(vinyl chloride) (PVC) was tested as a coating shell using a 10 wt % PTSA on Silica (SA) solid, and a 5 wt % PVC in THF solution was supplied to the coating applicator, to produce 1, 2, and 2.6% coatings on breaker particulates. When added to hydrocarbon base fluid containing gel, the coating particle delivered a delayed break, falling from 300 cP to 150 cP in 0.5 hours, further to about 50 cP in 1-1.5 hours, and achieving a full break in 2-6 hours. PVC was also tested as a coating shell using 10 wt % PTSA on SA solid, coated with 6 wt % PVC. When added to 10 mM BTA6 gel in TG740 the coating particle delivered a delayed break, falling from about 275 cP to about 125 cP in 0.5 hours, further to 50 cP in 1.5 hours and achieving a full break in 6.5 hour. A coating level of for example 1-35 wt % of plastic on particle appears to be sufficient to provide the desired delay. The PVC coating tested swells but does not fully dissolve in the base fluid. PVC prevents passage of solid acid through the coating shell but permits passage of acid dissolved in base fluid, by osmosis. Solidity of breaker materials may be measured at standard room temperature and pressure. Suitable adsorbents may be porous to the breaker, with a high surface area to permit large amounts of breaker to adsorb on small particles. For example, 30-50 mesh Si may be used. Rubber and toluene may be used as one combination of polymer and base fluid. Coating percentages of over 15% may be used to minimize or avoid the effect of proppant crushing of breaker particulates.

Breaker particulates with coating shells of poly(acrylamide) (1, 2, 3, and 4% coatings) and poly(vinylalcohol) (1, 2, and 3% coatings) did not achieve full break, but did in some cases reduce viscosity by about half. For example, poly(acrylamide) coatings reduced viscosity by half with gel concentrations of 10 kg/m3 over 14 hours, and failed to break at all at 3 kg/m3 gel concentration. By contrast, poly(vinylalcohol) reduced viscosity by half or more with 1 kg/m3 of gel over 4-14 hours, and failed to break at all with 1 kg/m3 gel. Latex was attempted and failed to break as the breaker could not leave the coating shell. However, latex is expected to work in a water base fluid. Poly(butadiene) nad poly(vinylidene chloride) were also tested as coatings.

Proposed Mechanism of Action of Sulfonic Acid or Superacid Breakers

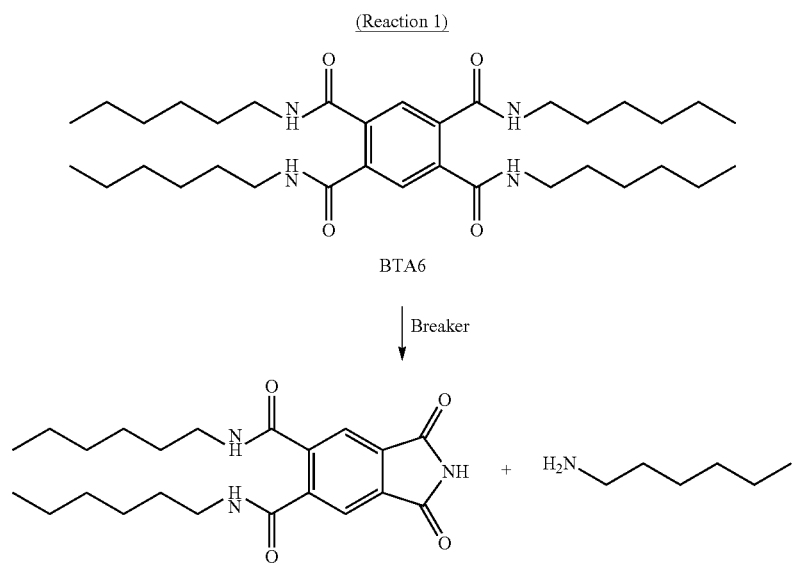

Based on an understanding of the chemical reactions involved and the chemistry of the acid breaker, it is soundly predicted that what is occurring is that the breaker facilitates an acid-catalyzed deamination reaction, which forms a cyclic imide on one side of the BTA6 (also releasing a molecule of hexylamine). The product above has a branched phthalimide substructure. NMR and mass spectrometry evidence appear to support such a theory. The reaction may proceed to approximately 10-15% conversion (percent of gel molecules that react) regardless of the amount of acid added. Such reaction is sufficient to fully break the gel.

In an embodiment, an acid is absorbed onto a high surface area inert material and then the material is coated with a polymer coating. Such provides a delayed break, sufficient to carry out a fracturing job. Suitable inert material includes diatomaceous earth, silica, zeolites, and clay. Suitable acids include super acids, para-toluene sulfonic acid. In some cases very little acid is needed as it catalyzes the rearrangement of the pyromellittamide so it destroys the hydrogen bonding system by destroying the molecule. Suitable coating materials include insoluble and soluble (in hydrocarbon) polymeric materials. The breaker may directly or indirectly cause the chemical modification.

Adjacent amide groups may be anchored one position away from one another on an aromatic ring in some cases. The catalysis of the deamination reaction may be pKa dependent, so that below a pKa threshold the breaker acts directly to destroy the gel, with X breaker molecules consumed for one gelling agent molecule, for example acetic acid. Above the threshold the reaction working to regenerate each catalyst to act in a more efficient fashion on plural gelling agent molecules. A sufficient pKa may be anything above HCl in some cases, or anything above hydrosulfuric acid in other cases. NAFION™ bead particles may be used as breakers.

The fluids disclosed here may incorporate other suitable chemicals or agents such as proppant. The downhole treatment fluids disclosed herein may be used in a method, for example a fracturing treatment as shown in FIG. 1, of treating a downhole formation. The gelling agents may be used in oil recovery enhancement techniques.

Referring to FIG. 1, a method and system is illustrated, although connections and other related equipment may be omitted for simplicity of illustration. A base fluid, such as a hydrocarbon frac fluid, is located in storage tank 10 and may be passed through piping 12 into a well 22 and introduced into a downhole formation 24, such as an oil or gas formation. Gel may be combined with the base fluid to make a downhole fluid. For example, gel may be added on the fly from a gel tank 14, or may be pre-mixed, for further example in tank 10. Other methods of gelling the base fluid may be used. For example batch mixing may be used to make the gel. Other storage tanks 16 and 18 may be used as desired to add other components, such as proppant or breaker, respectively to the downhole fluid.

Referring to FIG. 1 the downhole fluid may be recovered from the downhole formation 24, for example through a recovery line 28, and recycled, for example using one or more recycling apparatuses 26. The recycling stage may incorporate removal of one or more compounds within the recovered fluid, for example if breaker is removed. Distillation may be used, for example to remove alcohol or amine, and aqueous separation may be used, for example to remove salts.

A base may be used as a breaker in some cases. A base is soundly predicted to be able to catalyze the reaction on the basis of the nature of the chemical reaction and the bond breaking function of bases, for example if the base is a strong base and oil soluble, for example a lithium salt of hydrocarbon, such as Li+-CH2CH2CH2CH3. Such a base may be supplied in solid form.

The basic structure of the amide branched aromatic gelling agents is believed to be primarily responsible for the gellation mechanism, with variation in the side chains being useful to tailor the resultant gel. The gelation mechanism is believed to be through intermolecular hydrogen bonds, and the structural modification of the gelling agent thus destroys or deactivates the gelling agent and the hydrogen bond network. The successful tests and disclosure reported here support use of the claimed spectrum of non-tested breakers with various non-tested amide branched aromatic and pyromellitamide gels with various non-tested base fluids, for example non-polar and hydrocarbon based fluids, using various non-tested coatings and non-tested adsorbents. Polar base fluids may be used in some cases. The use of coatings, adsorbents, or both act to slow down the break.

Examples of other gelling agents that may be broken are disclosed in U.S. Pat. No. 6,645,577.

As shown above the gelling agents may have benzene as an aromatic core. However, other aromatic cores may be used. For example, naphthalene may be used as an aromatic core. Aromatic cores may be flat and are expected to facilitate the formation of the layered gel mechanism discussed above.

As shown above, each amide branch may have one organic group or side chain. However, in some cases one or more of the amide branches have two organic groups. For example, the amide branch connects to the aromatic core via a carbon-nitrogen bond, the nitrogen has an alkyl group and the carbonyl carbon has an organic group. Other examples may be used. One or more amide branches may have two organic groups on the amide nitrogen, so long as at least one, two, or more amide branches have an amide nitrogen with a free hydrogen for hydrogen bonding. In other cases each amide branch nitrogen has one hydrogen atom for maximum facilitation of hydrogen-bonding and gel formation. Non-alkyl organic side chains may be used. Organic groups with five or less carbon atoms may be used.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of breaking a gel, the gel comprising base fluid and gelling agent, each gelling agent having a pair of amide groups distributed about an aromatic core, each of the amide groups having one or more organic groups, the method comprising modifying the molecular structure of the gelling agent by using a breaker to cleave or make a covalent bond in the gelling agent in which modifying comprises cleaving a covalent bond in the gelling agent, and cleaving comprises cleaving one or more of the amide groups and converting a pair of the amide groups into an imide group.

2. The method of claim 1 in which the imide group and aromatic core form a phthalimide substructure.

3. The method of claim 1 in which the breaker acts as a catalyst for the modifying.

4. The method of claim 3 in which the breaker comprises an acid.

5. The method of claim 1 further comprising, prior to modifying, supplying the breaker into the base fluid in particulate form, each particulate having a coating shell.

6. The method of claim 5 in which the coating shell is insoluble in, and permeable to, the base fluid, and further comprising transporting the breaker from within the coating shell to outside the coating shell using base fluid.

7. The method of claim 6 in which the breaker is a solid within the particulates when the breaker is supplied into the base fluid.

8. The method of claim 5 in which the coating shell comprises a polymer.

9. The method of claim 8 in which the coating comprises one or more of poly(vinylidene chloride) (PVDC), poly(isoprene), poly(neoprene), poly(butadiene), poly(styrene cobutadiene), and poly(styrene).

10. The method of claim 8 in which the coating comprises poly(vinylchloride).

11. The method of claim 5 in which the breaker is adsorbed onto an adsorbent within the particulates when the breaker is supplied into the base fluid.

12. The method of claim 11 in which the adsorbent comprises one or more of diatomaceous earth, silica, zeolites, and clay.

13. The method of claim 1 in which the gelling agent is a pyromellitamide gelling agent and has the general formula of:

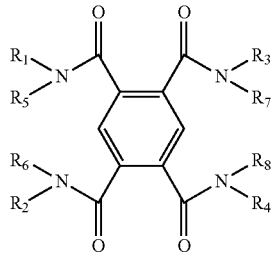

with $R_1$, $R_2$, $R_3$, $R_4$, $R_5$, $R_6$, $R_7$, and $R_8$ each being a hydrogen or an organic group.

14. The method of claim 13 in which $R_5$, $R_6$, $R_7$, and $R_8$ are each hydrogens and one or more of $R_1$, $R_2$, $R_3$, and $R_4$ is each an alkyl group.

15. The method of claim 14 in which $R_1=R_2=R_3=R_4$, and each alkyl group has 6-24 carbon atoms.

16. The method of claim 1 further comprising, prior to modifying, injecting the base fluid, gelling agent, and breaker into a downhole formation.

17. A method of breaking a gel, the gel comprising base fluid and gelling agent, each gelling agent having a pair of amide groups distributed about an aromatic core, each of the amide groups having one or more organic groups, the method comprising modifying the molecular structure of the gelling agent by using a breaker to cleave or make a covalent bond in the gelling agent, in which the breaker acts as a catalyst for the modifying, the breaker comprises an acid, and the acid comprises a sulfonic acid.

18. The method of claim 17 in which the sulfonic acid comprises para toluenesulfonic acid.

19. The method of claim 17 in which the sulfonic acid comprises one or more of Camphor-10-sulfonic acid, ethane sulfonic acid, 2-naphthalene sulfonic acid, 2-sulfobenzoic acid hydrate, benzene sulfonic acid, and trifluoromethane sulfonic acid.

* * * * *